(12) United States Patent
Eguchi

(10) Patent No.: US 6,344,016 B1
(45) Date of Patent: Feb. 5, 2002

(54) APPARATUS FOR CONTROLLING STARTING CLUTCH IN VEHICLE HAVING FUNCTION OF STOPPING ENGINE IDLING

(75) Inventor: Takahiro Eguchi, Tochigi-ken (JP)

(73) Assignee: Honda Kogyo Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/619,766

(22) Filed: Jul. 19, 2000

(30) Foreign Application Priority Data

Jul. 21, 1999 (JP) .......................................... 11-206432

(51) Int. Cl.⁷ .............................................. B60K 41/02
(52) U.S. Cl. ........................................................ 477/175
(58) Field of Search ................................. 477/174, 175

(56) References Cited

U.S. PATENT DOCUMENTS 5,980,428 A  * 11/1999 Liu ............................. 477/180
6,190,282 B1 *  2/2001 Deguchi et al. ................ 477/5
6,218,743 B1 *  4/2001 Hayashi et al. ............ 307/10.6

* cited by examiner

Primary Examiner—Dirk Wright
(74) Attorney, Agent, or Firm—Armstrong, Westerman, Hattori, McLeland & Naughton, LLP

(57) ABSTRACT

At the time of vehicle start-up from the state of engine stopping, a hydraulic oil pressure in a starting clutch sometimes overshoots beyond a creeping pressure as a result of a rise in the hydraulic oil pressure in the hydraulic circuit, resulting in shocks. A hydraulic oil pressure command value to a linear solenoid valve which controls the starting clutch pressure is made smaller than the creeping pressure until the point of time at which the rise in the hydraulic oil pressure in the hydraulic circuit (=the point of time at which a condition of F2=1 is satisfied). Once a discrimination of a rise in the hydraulic oil pressure has been made, the command value is made higher than the creeping pressure for a predetermined period of time (i.e., for the period of YTM3–YTM3B1), and is thereafter made to the creeping pressure.

12 Claims, 8 Drawing Sheets

APPARATUS FOR CONTROLLING STARTING CLUTCH IN VEHICLE HAVING FUNCTION OF STOPPING ENGINE IDLING

BACKGROUND OF THE INVENTION

1. Field of the Invention

The present invention relates to an apparatus for controlling a starting clutch made up of a hydraulic clutch provided in a transmission of a vehicle having a function of stopping engine idling in which an engine is automatically stopped under given conditions when the vehicle is at a standstill.

2. Description of Related Art

Conventionally, there is known an apparatus for controlling a hydraulic oil pressure in a starting clutch by a linear solenoid valve which is provided in a hydraulic circuit. The hydraulic circuit has, as a hydraulic oil pressure source, a hydraulic oil pump to be driven by an engine of a vehicle. In an ordinary vehicle in which engine idling is continued when the vehicle is at a standstill, the following steps are taken. Namely, at the time of vehicle start-up, a command signal is given to the linear solenoid valve such that the hydraulic oil pressure in the starting clutch (starting clutch pressure) becomes a creeping pressure at which the vehicle gives rise to creeping. Once the vehicle has started up, the starting clutch pressure is increased (or boosted) to a hydraulic oil pressure which is the pressure at the time of an ordinary running of the vehicle.

On the other hand, in a vehicle having a function of stopping engine idling, a hydraulic oil pressure in a hydraulic circuit becomes zero as a result of stopping the engine when the vehicle is at a standstill. At the time of vehicle start-up from this state, if a command signal to raise the starting clutch pressure is given to a linear solenoid valve, the linear solenoid valve becomes fully opened. Therefore, when the hydraulic oil pressure in the hydraulic circuit has risen as a result of starting the drive of the hydraulic oil pump accompanied by the starting of the engine, the starting clutch pressure will overshoot to a value exceeding the command value. Therefore, if the command value of the starting clutch pressure has already become the creeping pressure, the starting clutch pressure exceeds the creeping pressure. As a result, the starting clutch is rapidly engaged to thereby give rise to shocks.

In view of the above points, the present invention has an object of providing an apparatus for controlling a starting clutch in a vehicle having a function of stopping engine idling, in which the vehicle start-up from the state of engine stopping can be made smoothly and at a good response.

SUMMARY OF THE INVENTION

In order to attain the above and other objects, the present invention is an apparatus for controlling a starting clutch made up of a hydraulic clutch provided in a transmission of a vehicle having a function of stopping engine idling so that an engine is automatically stopped under given conditions when the vehicle is at a standstill, wherein a hydraulic oil pressure in the starting clutch is controlled by a linear solenoid valve provided in a hydraulic circuit having, as a hydraulic oil pressure source, a hydraulic oil pump driven by the engine, the apparatus comprising: first hydraulic oil pressure command means which, at a time of vehicle start-up from a state of engine stopping, sets that hydraulic oil pressure command value in the starting clutch which is controlled by the linear solenoid valve to a predetermined initial pressure until the hydraulic oil pressure in the hydraulic circuit rises, the initial pressure being lower than a creeping pressure at which creeping of the vehicle occurs; second hydraulic oil pressure command means which, during a predetermined period of time from a time at which the hydraulic oil pressure in the hydraulic circuit has risen to a time at which the hydraulic oil pressure increases to the creeping pressure, changes the hydraulic oil pressure command value to an ineffective stroke eliminating pressure which is higher than the creeping pressure; and third hydraulic oil pressure command means which changes the hydraulic oil pressure command value to the creeping pressure after a lapse of the predetermined period of time.

According to the present invention, the hydraulic oil pressure command value at the beginning of the vehicle start-up becomes the initial pressure which is lower than the creeping pressure. Therefore, even if there is no residual pressure in the hydraulic circuit and the linear solenoid valve is thus fully opened, with the result that the hydraulic oil pressure in the starting clutch (starting clutch pressure) overshoots the hydraulic oil pressure command value when the hydraulic oil pressure in the hydraulic circuit has risen, the starting clutch pressure will become a pressure about the creeping pressure. Shocks will therefore not occur.

It is also considered to switch the hydraulic oil pressure command value to the creeping pressure when the hydraulic oil pressure in the hydraulic circuit has risen. This method, however, has the following disadvantage. Namely, it takes time to eliminate or minimize the ineffective stroke of the starting clutch and, therefore, the pressure increase (boosting) in the starting clutch pressure is delayed, resulting in a larger time lag in the vehicle start-up.

In the present invention, on the other hand, the hydraulic oil pressure command value is switched to an ineffective stroke eliminating pressure which is higher than the creeping pressure when the hydraulic oil pressure in the hydraulic circuit has risen. The ineffective stroke of the starting clutch can therefore be eliminated or minimized at a short time. By subsequently switching the hydraulic oil pressure command value to the creeping pressure, the starting clutch pressure can be quickly increased to the creeping pressure without giving rise to overshooting. In this manner, the vehicle start-up from the state of engine stopping can be performed smoothly and at a good response.

It is also possible to provide a hydraulic oil pressure sensor to detect the hydraulic oil pressure in the hydraulic circuit. When the pressure rise in the hydraulic circuit has been detected by the hydraulic oil pressure sensor, the hydraulic oil pressure command value is switched from the initial pressure to the ineffective stroke eliminating pressure. This method, however, becomes higher in cost.

If the hydraulic oil pressure in the hydraulic circuit rises in a state in which the linear solenoid valve is fully opened, the linear solenoid valve is returned toward the closed position. A counter-electromotive force will then be generated in a solenoid of the linear solenoid valve. Therefore, by providing means for discriminating a rise in the hydraulic oil pressure in the hydraulic circuit (first discriminating means for discriminating a rise in the hydraulic oil pressure) based on the counter-electromagnetic force to be generated in the solenoid of the linear solenoid valve, the cost increase can be avoided. In this arrangement, should the hydraulic oil pressure vary even slightly, the counter-electromotive force will be generated, and there is a possibility of making a wrong discrimination. It is therefore preferable to provide prohibiting means for prohibiting the discrimination by the first discriminating means until a rotational speed of the engine increases to a certain value (a first predetermined speed).

In case there is a residual pressure in the hydraulic circuit because the vehicle is right after the engine stopping, the linear solenoid valve will not be fully opened. Therefore, it becomes difficult to discriminate the rise in the hydraulic oil pressure by means of the counter-electromotive force which is generated in the solenoid of the linear solenoid valve. It is to be noted here that, when the rotational speed of the engine exceeds a certain value (a second predetermined speed), the hydraulic oil pressure in the hydraulic circuit surely rises. Therefore, it is preferable to provide means for discriminating (second discriminating means for discriminating a rise in the hydraulic oil pressure) that the hydraulic oil pressure has risen when the rotational speed of the engine has increased to a second predetermined speed so as to cope with the vehicle start-up in a state in which there is a residual pressure in the hydraulic circuit.

In order to detect that rotational speed of the engine which serves as a discriminating parameter in the above-described prohibiting means and the second discriminating means for discriminating a rise in the hydraulic oil pressure, it is considered to provide a rotational speed sensor which is made up of a pulser gear mounted on a crank shaft and a pickup. This solution, however, becomes higher in cost. To reduce the cost, it is considered to input the engine ignition pulses into an onboard (vehicle-mounted) computer so that the rotational speed of the engine is calculated from the difference in time of inputting the engine ignition pulses of the engine. However, the engine ignition pulses are inputted only in number corresponding to the number of cylinders of the engine within two rotations of the crank shaft. At the time of rapid increase in the rotational speed of the engine such as at the time of vehicle start-up from the state of engine stopping, the rotational speed of the engine to be calculated from the difference in time of inputting the engine ignition pulses becomes considerably smaller than the actual rotational speed of the engine. In this case, it is preferable to make the following arrangement. Namely, a rotational speed to be calculated by a difference between a time of inputting a first engine ignition pulse and a time of inputting a second engine ignition pulse, both pulses being inputted after the engine stopping, is defined as a provisional speed, and a point of time at which the rotational speed of the engine increases to the first predetermined speed is obtained from the provisional speed. Further, at the time of vehicle start-up from a state in which the engine is not completely stopped, out of rotational speeds to be calculated by a difference between times of inputting two consecutive engine ignition pulses, a first rotational speed at which the rotational speed has changed for an increase is defined to be a provisional speed, and a point of time at which the rotational speed of the engine increases to the first predetermined speed is obtained from the provisional speed. By this arrangement, the accuracy of discrimination based on the rotational speed of the engine in the above-described prohibiting means and the above-described second discriminating means for the rise in the hydraulic oil pressure can be improved.

Further, in a vehicle in which the transmission has a belt-type continuously variable transmission mechanism which is provided on an input side of the starting clutch and which inputs the power from the engine through a power transmission mechanism such as a forward/reverse switching mechanism having built-in hydraulically operated frictional elements, when there is a residual pressure in the hydraulic circuit, the power transmission mechanism is maintained in a state which is capable of transmitting the power. Consequently, with the start of the engine, the drive pulley of the continuously variable transmission mechanism is also rotated. Therefore, there may be provided means for discriminating that the hydraulic oil pressure has risen (third discriminating means for discriminating a rise in the hydraulic oil pressure) when the rotational speed of the drive pulley has increased to a predetermined speed.

In the preferred embodiments which are described in detail hereinbelow, what corresponds to the above-described first hydraulic oil pressure command means is step S6 in FIG. 3. What corresponds to the above-described second hydraulic oil pressure command means is step S11 in FIG. 3. What corresponds to the above-described third hydraulic oil pressure command means is step S16 in FIG. 3. What corresponds to the above-described first discriminating means for discriminating a rise in the hydraulic oil pressure is step S4-26 in FIG. 4. What corresponds to the above-described prohibiting means is step S4-24 in FIG. 4. What corresponds to the above-described second hydraulic oil pressure rise discriminating means is step S4-32 in FIG. 4. What corresponds to the above-described third hydraulic oil pressure rise discriminating means is step S4-31 in FIG. 4.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
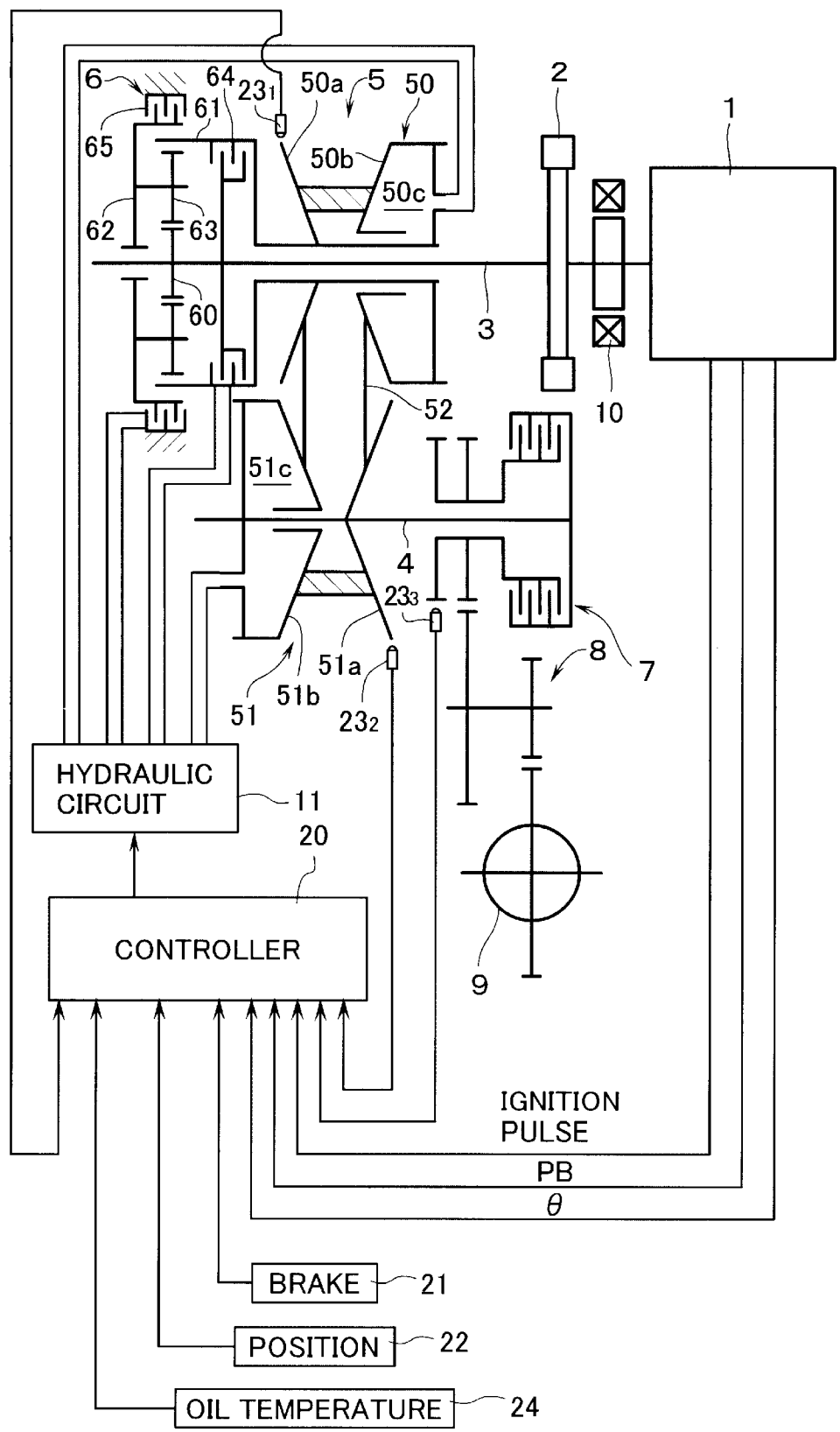
FIG. 1 is a skeleton diagram showing one example of a transmission which is provided with a starting clutch to be controlled by the apparatus of the present invention.

FIG. 1 shows a transmission of a vehicle such as a motor vehicle. This transmission is made up of: a belt-type continuously (or steplessly) variable transmission mechanism 5 which is disposed between an output shaft 4 and an input shaft 3 to be connected to an engine 1 through a coupling mechanism 2; a switching mechanism 6 which switches between forward running and reverse running (hereinafter called forward/reverse switching mechanism 6) and which serves as a power transmission mechanism disposed on an input side of the continuously variable transmission mechanism 5; and a starting clutch 7 which is made up of a hydraulic clutch disposed on an output side of the continuously variable transmission mechanism 5.

The continuously variable transmission mechanism 5 is made up of: a drive pulley 50 which is rotatably supported on the input shaft 3; a driven pulley 51 which is connected to the output shaft 4 so as not to rotate relative to the output shaft 4; and a metallic V-belt 52 which is wound around both the pulleys 50, 51. Each of the pulleys 50, 51 is made up of: a fixed flange 50a, 51a; a movable flange 50b, 51b which is axially movable relative to the fixed flange 50a, 51a; and a cylinder 50c, 51c which urges or pushes the movable flange 50b, 51b toward the fixed flange 50a, 51a. By adequately controlling the pressure of hydraulic oil to be supplied to the cylinder 50c, 51c of each of the pulleys 50, 51, there is generated an adequate pulley side-pressure which does not give rise to the slipping of the V-belt 52. Also, by varying the pulley width of both the pulleys 50, 51, the diameter of winding the V-belt 52 on the pulleys 50, 51 is varied, whereby continuously variable speed changing is provided.

The forward/reverse switching mechanism 6 is constituted by a planetary gear mechanism which is made up of: a sun gear 60 which is connected to the input shaft 3; a ring gear 61 which is connected to the drive pulley 50; a carrier 62 which is rotatably supported by the input shaft 1; a planetary gear 63 which is rotatably supported by the carrier 62 and which is meshed with the sun gear 60 and the ring gear 61; a forward running clutch 64 which serves as a hydraulically operated friction element capable of connecting the input shaft 3 and the ring gear 61; and a reverse running brake 65 which serves as hydraulically operated friction element capable of fixing the carrier 62. When the forward running clutch 64 is engaged, the ring gear 61 rotates together with the input shaft 3, and the drive pulley 50 is rotated in the same direction as the input shaft 3 (i.e., forward running direction). When the reverse running brake 65 is engaged, on the other hand, the ring gear 61 is rotated in a direction opposite to that of the sun gear 60, and the drive pulley 50 is driven in a direction opposite to that of the input shaft 3 (i.e., in the reverse running direction). When both the forward running clutch 64 and the reverse running brake 65 are released, the power transmission through the forward/reverse switching mechanism 6 is interrupted.

The starting clutch 7 is connected to the output shaft 4. When the starting clutch 7 is engaged, the output of the engine whose speed has been changed by the continuously variable transmission mechanism 5 is transmitted to a differential 9 through gear trains 8 on the output side of the starting clutch 7, whereby the driving force is transmitted to the left and right driving wheels (not illustrated) of the vehicle from the differential 9. When the starting clutch 7 is released, the power transmission does not take place, and the transmission becomes a neutral state.

In addition, an electric motor 10 is directly connected to the engine 1. The electric motor 10 performs power assisting at the time of acceleration, or the like, recovering of energy at the time of deceleration, and starting of the engine 1. While the vehicle is at a standstill, the engine 1 is automatically stopped if some given conditions are satisfied, e.g.: that the brake is on; that an air conditioner is switched off; and a brake booster negative pressure is above a predetermined value; or the like. If the brake is subsequently off, the engine 1 is started by the electric motor 10, whereby the vehicle is started up from the state of the engine stopping.

Figure 2:
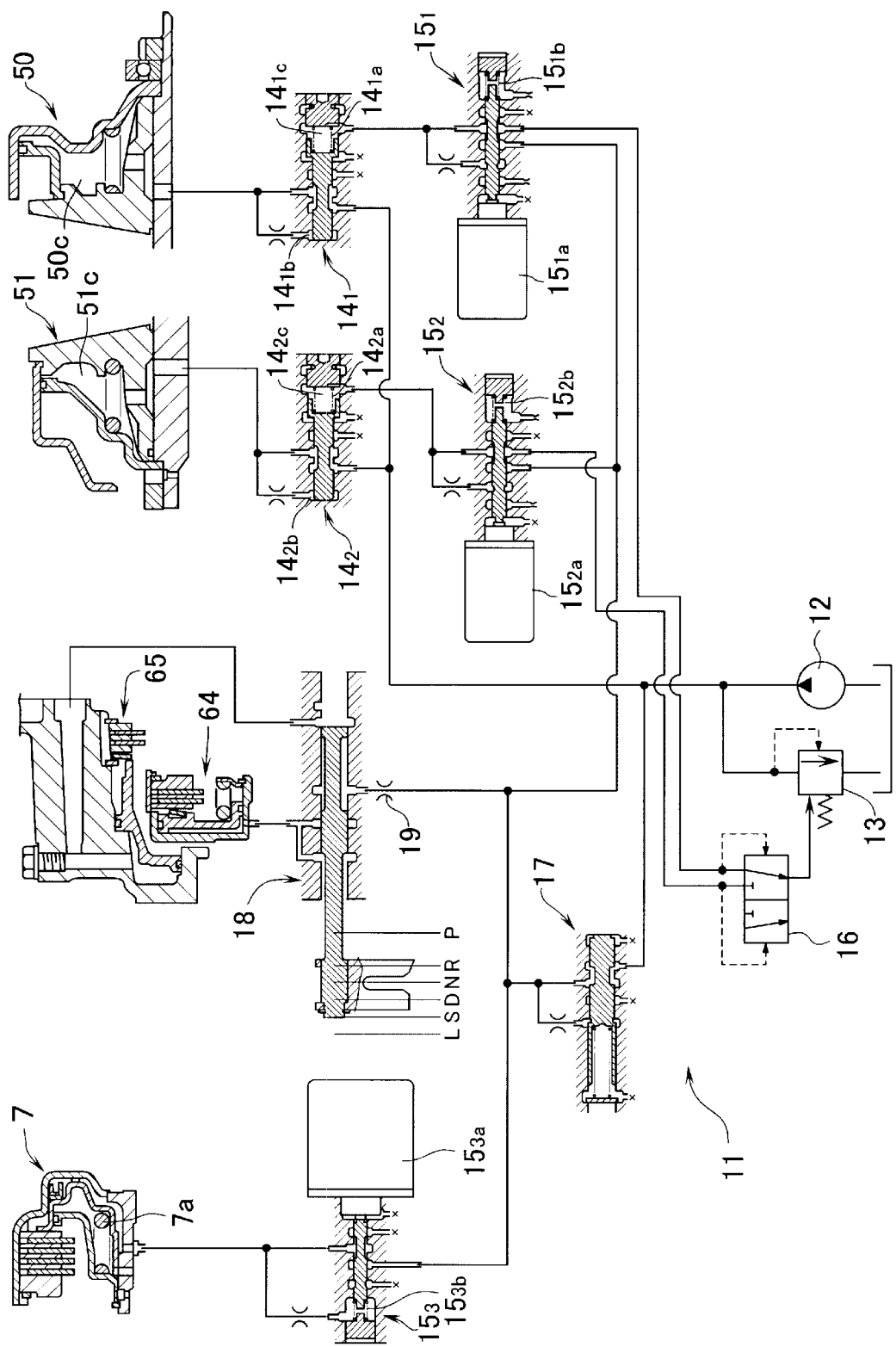
FIG. 2 is a diagram showing a hydraulic circuit of the transmission in FIG. 1.

The hydraulic oil pressures in the cylinder 50c, 51c of each of the pulleys 50, 51 of the continuously variable transmission mechanism 5, in the forward running clutch 64, in the reverse running brake 65 and in the starting clutch 7 are controlled by a hydraulic circuit 11. As shown in FIG. 2, the hydraulic circuit 11 is provided with a hydraulic oil pump 12 which is driven by the engine 1. The delivery pressure from this hydraulic oil pump 12 is regulated by a regulator 13 to a predetermined line pressure. The hydraulic oil pressures (pulley side-pressure) in each of the cylinders 50c, 51c of the drive pulley 50 and the driven pulley 51 can be regulated by each of the first and second pressure regulating valves $14_1$, $14_2$ with the line pressure serving as a base pressure. Each of the first and second pressure regulating valves $14_1$, $14_2$ is urged by a spring $14_{1a}$, $14_{2a}$ toward the leftward open position, and is urged by the pulley side-pressure to be inputted into a left end oil chamber $14_{1b}$, $14_{2b}$ toward the rightward closed position. Further, there are provided a first linear solenoid valve $15_1$ for the first pressure regulating valve $14_1$ and a second linear solenoid valve 152 for the second pressure regulating valve $14_2$. An output pressure from each of the first and second linear solenoid valves $15_1$, $15_2$ is inputted into a right end oil chamber $14_{1c}$, $14_{2c}$ of each of the pressure regulating valves $14_1$, $14_2$. In this manner, it is arranged that each of the pulley side-pressures in the drive pulley 50 and the driven pulley 51 can be controlled by each of the first and second linear solenoid valves $15_1$, $15_2$. The output pressure which is the higher pressure between the output pressures of the first and second linear solenoid valves $15_1$, $15_2$ is inputted into the regulator 13 through a changeover valve 16. By controlling the line pressure by this output pressure, an appropriate pulley side-pressure which does not give rise to slipping of the belt 52 is generated. Each of the first and second linear solenoid valves $15_1$, $15_2$ is urged toward the leftward open position by a spring $15_{1b}$, $15_{2b}$ and is also urged toward the rightward closed position by its own output pressure and an electromagnetic force of a solenoid $15_{1a}$, $15_{2a}$. With a modulator pressure (a pressure which is lower than the line pressure by a certain value) from a modulator valve 17 serving as a basic pressure, a hydraulic oil pressure in inverse proportion to the value of an electric current charged to the solenoid $15_{1a}$, $15_{2a}$ is outputted.

To the starting clutch 7, there is connected an oil passage which supplies the modulator pressure, and a third linear solenoid valve $15_3$ is interposed in this oil passage. The third linear solenoid valve $15_3$ is urged toward the rightward closed position by a spring $15_{3b}$ and the hydraulic oil pressure of the starting clutch and is also urged toward the leftward open position by an electromagnetic force of the solenoid $15_{3a}$. In this manner, the hydraulic oil pressure of the starting clutch 7 varies in proportion to the value of the electric current charged to the solenoid $15_{3a}$ with the modulator pressure as the basic pressure.

It is so arranged that the modulator pressure is inputted into the forward running clutch 64 and the reverse running brake 65 through the manual valve 18. The manual valve 18 can be switched into the following five positions in a manner interlocked with a selector lever (not illustrated): i.e., "P" position for parking; "R" position for reverse running; "N" position for neutral state; "D" position for ordinary running; "S" position for sporty running; and "L" position for low-speed holding. In each of the "D", "S" and "L" positions, the modulator pressure is supplied to the forward running clutch 64. In the "R" position, the modulator pressure is supplied to the reverse running brake 65. In each of the "N" and "P" positions, the supply of the modulator pressure to both the forward running clutch 64 and the reverse running brake 65 is stopped. To the manual valve 18, the modulator pressure is supplied through an orifice 19.

Each of the first through third linear solenoid valves $15_1$, $15_2$, $15_3$ is controlled by a controller 20 (see FIG. 1) which is made up of an onboard (a vehicle-mounted) computer. The controller 20 receives the inputs of the following: i.e., the ignition pulses of the engine 1, signals indicating the negative suction pressure PB of the engine 1, and the throttle opening degree θ; a signal from a brake switch 21 which detects the degree or amount of depression of a brake pedal; a signal from a position sensor 22 which detects a selected position of the selector lever; a signal from a speed sensor $23_1$ which detects a rotational speed, or a rotational frequency, of the drive pulley 50; a signal from a speed sensor $23_2$ which detects the rotational speed of the driven pulley 51; a signal from a speed sensor $23_3$ which detects the rotational speed on the output side of the starting clutch 7, i.e., the vehicle speed; and a signal from an oil temperature sensor 24 which detects the temperature of an oil in the transmission. Based on these signals, the controller 20 controls the first through third linear solenoid valves $15_1$, $15_2$, $15_3$.

If the engine 1 is stopped when the vehicle is at a standstill, the hydraulic oil pump 12 which serves as a hydraulic oil pressure source for the hydraulic circuit 11 is also stopped, whereby the hydraulic oil is drained from the hydraulic circuit 11. As a result, at the time of vehicle start-up from the state of the engine stopping, it takes time to reach an in-gear state (or a state of being geared in) in which the forward running clutch 64 or the reverse running brake 65 is engaged so that the forward/reverse switching mechanism 6 can transmit the power. If the starting clutch 7 has already been engaged before the in-gear state is attained, the power will be suddenly transmitted to the driving wheels of the vehicle as a result of gearing in of the forward/reverse switching mechanism 6, whereby shocks occur. Therefore, it is desirable to switch a control mode of the starting clutch 7, at the time when the forward/reverse switching mechanism 6 has just attained the in-gear state, from a start transition mode in which an ineffective stroke of the starting clutch 7 is eliminated or minimized to a running mode in which the engaging force of the starting clutch 7 is increased. In addition, in order to improve the starting response, it is desirable, in the start transition mode, to increase the hydraulic oil pressure in the starting clutch 7 to, and hold it at, a creeping pressure (a hydraulic oil pressure at which slipping of the starting clutch 7 does occur but at which a torque above an inertia of the vehicle can be transmitted). However, if that command value PSCCMD of the hydraulic oil pressure in the starting clutch 7 which is to be controlled by the third linear solenoid valve $15_3$ is changed to the creeping pressure from the beginning of the vehicle start-up, the following will happen. Namely, since no hydraulic oil pressure is available in the hydraulic circuit 11 at the beginning of the vehicle start-up, the third linear solenoid valve $15_3$ will be fully opened without receiving the hydraulic oil pressure which urges it toward the closed position. As a result, when the hydraulic oil pressure rises, the hydraulic oil pressure in the starting clutch 7 will overshoot to a value exceeding the creeping pressure, resulting in the occurrence of shocks. On the other hand, if the hydraulic oil pressure in the starting clutch 7 increases to the creeping pressure while the pulley side-pressure has not risen yet, a load corresponding to the inertia of the vehicle will operate or work on the driven pulley 51 through the starting clutch 7. As a result, the belt 52 will slip due to an insufficient belt side-pressure.

Figure 3:
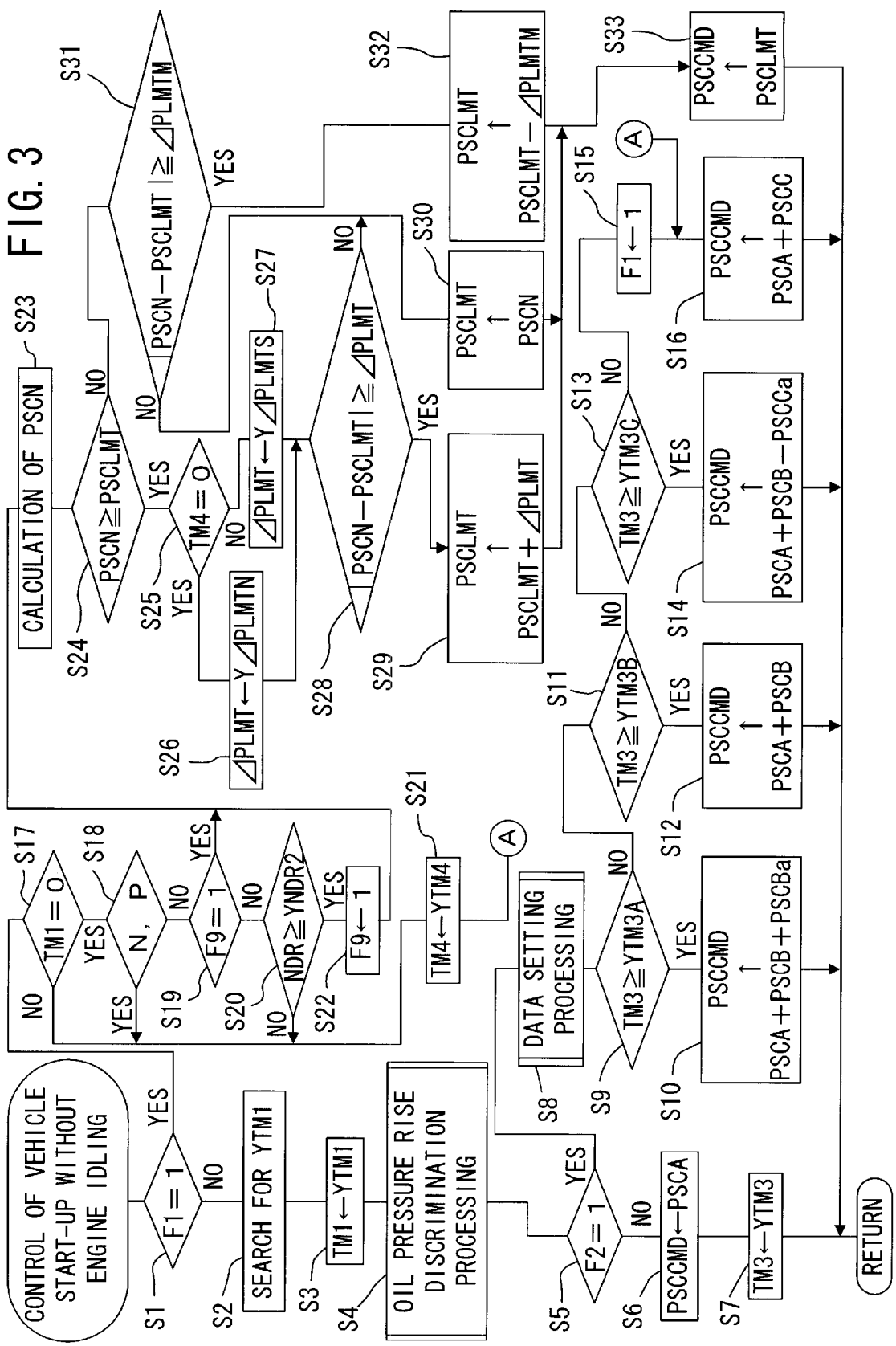
FIG. 3 is a flow chart showing a program for controlling the starting clutch at the time of vehicle start-up from the state of engine stopping.
Figure 6:
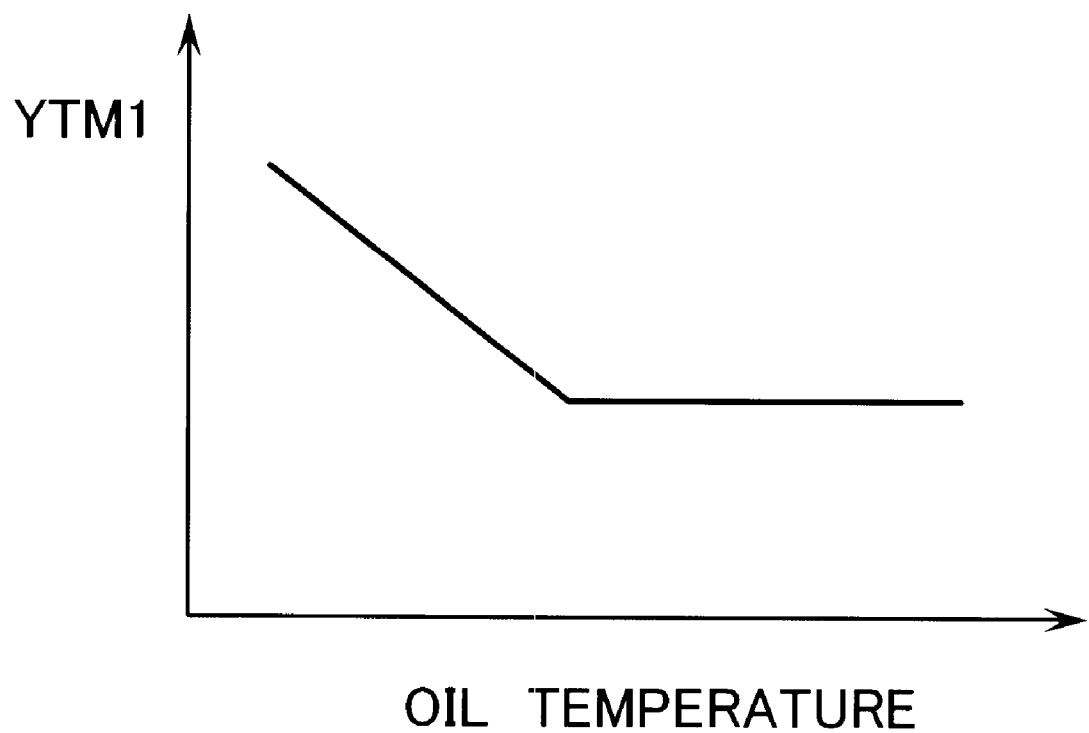
FIG. 6 is a graph showing a data table of YTM1 which is used in the searching at step S2 of the control program in FIG. 3.

In view of the above points, at the time of the vehicle start-up from the state of engine stopping, the starting clutch 7 is controlled by the program shown in FIG. 3. This control is performed at a predetermined time interval, e.g., at a time interval of 10 msec. First, at step S1, a discrimination is made as to whether a flag F1 has been set to "1" or not. Since the flag F1 has initially been reset to "0", a determination of "NO" is made at step S1. The program then proceeds to step S2, where a timer value YTM1 is searched. Considering the delay in response to the increase or boosting in the hydraulic oil pressure, the timer value YTM1 is set, as shown in FIG. 6, such that the lower the oil temperature becomes, the longer the timer value becomes. The value of YTM1 depending on the present oil temperature is searched in the data table of YTM1 which is prepared with the hydraulic oil temperature as a parameter. When the oil temperature is above the ambient temperature, the value YTM1 is set to about 50 msec. Then, after setting at step S3 the remaining time TM1 of a subtraction type of first timer to YTM1, the program proceeds to step S4 to perform the processing of discriminating the rise in the hydraulic oil pressure.

Figure 4:
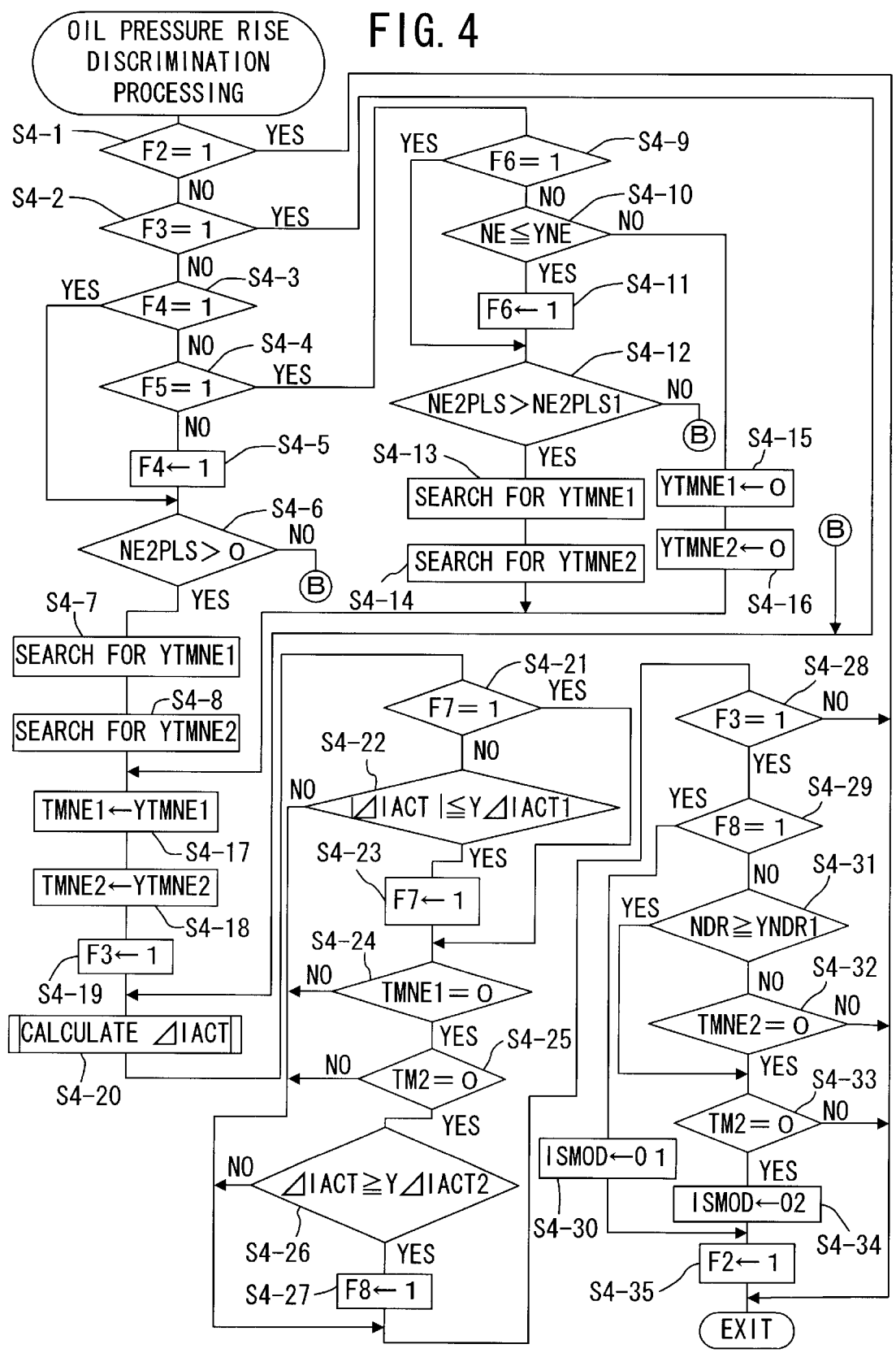
FIG. 4 is a flow chart showing the content of processing at step S4 of the control program in FIG. 3.

Details of the processing of discriminating the rise in the hydraulic oil pressure are shown in FIG. 4. At steps S4-1, S4-2, S4-3, a discrimination is made respectively as to whether a flag F2, F3, F4 has been set to "1" or not. Since the flag F2, F3, F4 has initially been reset to "0", the program proceeds to step S4-4 to discriminate as to whether a flag F5 has been set to "1" or not. The flag F5 is a flag to be prepared in a subroutine work and is set to "1" if even only one of the ignition pulses is inputted within a predetermined time (e.g., 500 msec). If there is no input at all of the ignition pulses, i.e., when the engine 1 can be judged to be completely stopped, the flag F5 is reset to "0." If F5 =0, the flag F4 is set to "1" at step S4-5, and the program proceeds to step S4-6. From the next time, the program proceeds from step S4-3 directly to step S4-6.

Figure 7A:
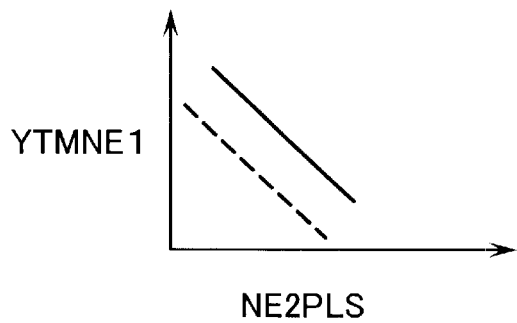
FIG. 7A is a graph showing a data table of YTMNE1 which is used in the searching at step S4-7 in FIG. 4, FIG. 7B, is a graph showing a data table of YTMNE2 which is used in the searching at step S4-8 in FIG. 4.
Figure 7B:
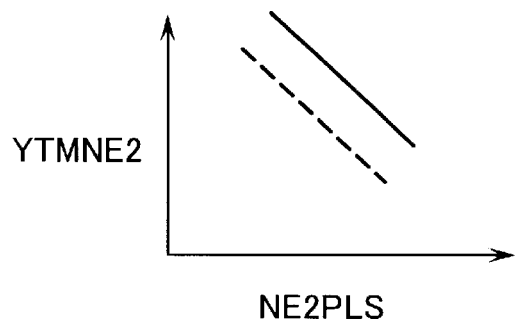
FIG. 7C is a graph showing the principle of estimating the rotational speed of the engine by means of YTMNE1 and YTMNE2.
Figure 7C:
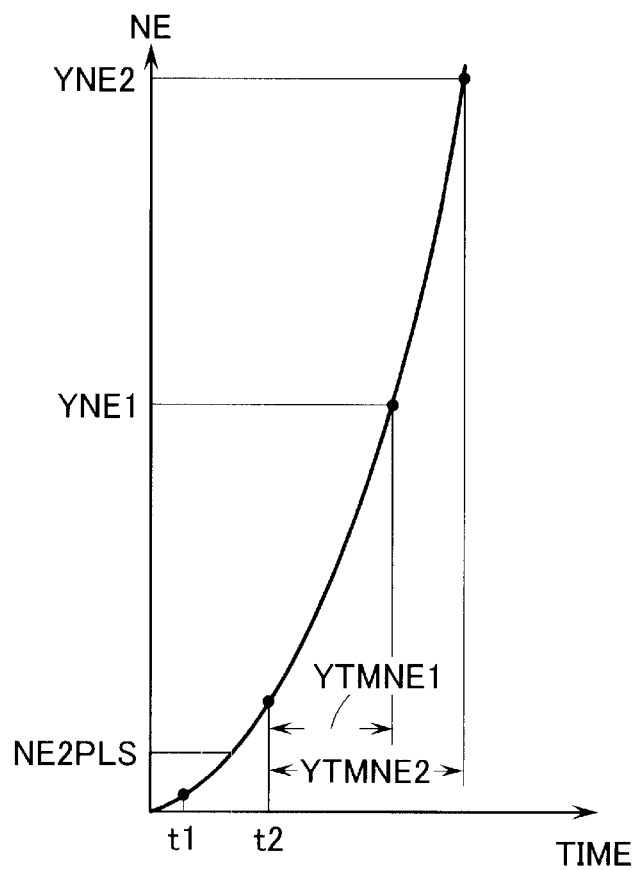

At step S4-6, a discrimination is made as to whether that rotational speed NE2PLS of the engine 1 which is calculated by the difference between the times of inputting two consecutive ignition pulses is larger than zero. The computation of NE2PSL is performed in a sub-routine work. It is when NE2PSL calculated by the difference between the time of inputting a first ignition pulse and the time of inputting a second ignition pulse, which are inputted after the engine stopping, becomes larger than zero that a determination of "YES" is made at step S4-6. Then, if a determination of "YES" is made at step S4-6, the program proceeds to step S4-7, where a timer value YTMNE1 which obtains or finds out the point of time at which the rotational speed NE of the engine 1 increases to a first predetermined speed YNE1 (e.g., 500 rpm) is searched. Then, the program proceeds to step S4-8, where a timer value YTMNE2 which obtains the point of time at which the rotational speed NE of the engine 1 increases to a second predetermined speed YNE2 (e.g., 900 rpm) is searched. As shown in FIGS. 7A and 7B, the values YTMNE1 and YTMNE2 are set such that the larger NE2PLS becomes, the shorter YTMNE1 and YTMNE2 become. With reference to FIG. 7C, reference character t1 denotes a point of time at which the first ignition pulse is inputted, and reference character t2 denotes a point of time at which the second ignition pulse is inputted. The rotational speed NE2PLS that is calculated from the difference in times of inputting both ignition pulses becomes considerably smaller than the actual rotational speed NE of the engine 1 at that point of time. However, the time required for the rotational speed NE of the engine 1 to increase from the point of time t2 to each of the predetermined speeds YNE1, YNE2 can be obtained from NE2PLS at a considerably high accuracy. Based on this principle, YTMNE1 and YTMNE2 are set.

In case the vehicle start-up takes place before complete stopping of the engine 1, since the state of F5=1 has been established, the program proceeds from step S4-4 to step S4-9, where a discrimination is made as to whether the flag F6 has been set to "1" or not. Since the flag F6 has initially been reset to "0", a determination of "NO" is made at step S4-9. The program then proceeds to step S4-10, where a discrimination is made as to whether the rotational speed NE of the engine 1 obtained as an average value of a plurality of NE2PLS's is below a predetermined speed YNE (e.g., 500 rpm) or not. If a condition of NE≦YNE is satisfied, the flag F6 is set to "1" at step S4-11 and the program then proceeds to step S4-12. From the next time, the program proceeds from step S4-9 directly to step S4-12, where a discrimination is made as to whether the value of NE2PLS at this time has become larger than the value NE2PLS1 at the previous time. It is when NE2PLS has changed for an increase for the first time after the vehicle start-up that a determination of "YES" is made at step S4-12. Then, if a determination of "YES" is made at step S4-12, a searching for YTMNE1 and YTMNE2 is made at steps S4-13 and S4-14 with NE2PLS at this time serving as a parameter. YTMNE1 and YTMNE2 to be searched at steps S4-13 and S4-14 are set, as shown in dotted lines in FIGS. 7A and 7B, to become shorter than YTMNE1 and YTMNE2, as shown in solid lines, which are to be searched at steps S4-7 and S4-8.

When a determination of "NO" is made at step S4-10, YTMNE1 and YTMNE2 are made to zero at steps S4-15 and S4-16. Once the searching for YTMNE1 and YTMNE2 is finished as noted above, the remaining times TMNE1 and TMNE2 of substraction type of first and second timers for discrimination of NE are set at steps S4-17 and S4-18 to YTMNE1 and YTMNE2, respectively. Then, at step S4-19, the flag F3 is set to "1", and the program proceeds to step S4-20. From the next time, the program proceeds from step S4-2 directly to step S4-20.

At step S4-20, an amount of change ΔIACT of an effective value IACT of electric current charged to the solenoid 15$_{3a}$ of the third linear solenoid valve 15$_3$ is calculated. ΔIACT is calculated as a difference between a detected value of IACT at this time and an average value, e.g., of IACT detected three times before through IACT detected five times before. Once ΔIACT has been calculated, a discrimination is then made at step S4-21 as to whether the flag F7 has been set to "1" or not. Since F7 has initially been reset to "0", the program therefore proceeds to step S4-22, where a discrimination is made as to whether an absolute value of ΔIACT has become smaller than a predetermined value YΔIACT1 (e.g., 3.1 mA) or not. At the time of vehicle start-up from the state of engine stopping, when the hydraulic oil pressure command value PSCCMD rises from zero, the electric charging to the solenoid 15$_{3a}$ is started. And a feedback control of IACT is made so that IACT becomes a target electric current value which corresponds to PSCCMD. Therefore, until IACT becomes stable at the target electric current value, the state will be |ΔIACT|>YΔIATC1. Then, when a condition of |ΔIACT|≦YΔIATC1 has been satisfied, i.e., when IACT has been discriminated to be stable at the target electric current value, the flag F7 is set to "1" at step S4-23. The program, then, proceeds to step S4-24. From the next time, the program proceeds from step S4-21 directly to step S4-24.

At step S4-24, a discrimination is made as to whether the remaining time TMNE1 of the first timer for discriminating NE has become zero or not, i.e., as to whether the rotational speed NE of the engine 1 has increased to the first predetermined speed YNE1 or not (see FIG. 7C). If the result of this discrimination is "YES", a discrimination is made at step S4-25 as to whether the remaining time TM2 of a subtraction type of second timer has become zero or not. TM2 has initially been set to YTM2 at the beginning of vehicle start-up from the state of engine stopping. Then, if a condition of TM2=0 is satisfied after a lapse of time of YTM2 from the point of time of the vehicle start-up, a discrimination is made at step S4-26 as to whether ΔIACT has exceeded a predetermined value YΔIACT2 (e.g., 12.4 mA) or not.

If the vehicle start-up takes place from the state in which there is no hydraulic oil pressure in the hydraulic circuit 11 due to stopping of the engine, when the hydraulic oil pressure in the hydraulic circuit 11 has risen, the fully opened third linear solenoid valve 15$_3$ is returned toward the closed position. Counter-electromotive force will thus occur to the solenoid 15$_{3a}$, and IACT increases by the amount corresponding to the counter-electromotive force. Therefore, a determination can be made as to whether the hydraulic oil pressure in the hydraulic circuit 11 has risen or not by whether a condition of ΔIACT≧YΔIACT2 has been satisfied or not. There are sometimes cases where the condition of ΔIACT≧YΔIACT2 is not satisfied by the occurrence of a counter-electromotive force due to the changes in the hydraulic oil pressure at the transient period of the rise in the hydraulic oil pressure. Therefore, in order to prevent a wrong discrimination of the rise in the hydraulic oil pressure, in this embodiment, the following arrangement has been employed. Namely, step S4-24 is provided and, until a condition of TMNE1=0 is satisfied, i.e., until the rotational speed NE of the engine 1 increases to the first predetermined speed YNE1, the discrimination at step S4-26, i.e., the discrimination regarding the rise in the hydraulic oil pressure based on ΔIACT is not performed. The reason why step S4-25 is provided will be given in detail hereinafter.

When a condition of ΔIACT≧ΔIACT2 has been satisfied, the flag F8 is set to "1" at step S4-27, and then a discrimination is made at step S4-28 as to whether the flag F3 has been set to "1" or not. If a condition of F3=1 has been satisfied as a result of the setting processing at step S4-19, a discrimination is made at step S4-29 as to whether the flag F8 has been set to "1" or not. If a condition of F8=1 has been satisfied as a result of setting processing at step S4-27, a mode value ISMOD is set to "01" at step S4-30.

If the flag F8 has not been set to "1", a discrimination is made at step S4-31 as to whether the rotational speed NDR of the drive pulley 50 has already exceeded a predetermined first speed YNDR1 (e.g., 500 rpm) or not. If a condition is NDR<YNDR1, a discrimination is made at step S4-32 as to whether the remaining time TMNE2 of the second timer for discriminating the NE has become zero or not, i.e., as to whether the rotational speed NE of the engine 1 has increased to the second predetermined speed YNE2 or not (see FIG. 7C). When a condition of NDR≧YNDR1 or TMNE2=0 has been satisfied, a discrimination is made at step S4-33 as to whether TM2=0 or not. When TM2=0, a mode value ISMOD is set to "02" at step S4-34. Once the setting processing has been performed at step S4-30 or step S4-34, the flag F2 is set to "1" at step S4-35, and the subsequent processing of discriminating the rise in the hydraulic oil pressure is stopped.

When the vehicle start-up takes place from the state in which there is no hydraulic oil pressure in the hydraulic circuit 11, the rise in the hydraulic oil pressure can be discriminated based on ΔIACT as explained hereinabove, i.e., based on the counter-electromotive force of the solenoid $15_{3a}$ of the third linear solenoid valve $15_3$. On the other hand, if the vehicle start-up takes place in a state in which a residual pressure is present in the hydraulic circuit 11, the third linear solenoid valve $15_3$ will not be fully opened. The rise in the hydraulic oil pressure cannot therefore be discriminated based on the counter-electromotive force of the solenoid $15_{3a}$. When the hydraulic oil begins to be supplied to the forward running clutch 64 or to the reverse running brake 65 as a result of the start of the engine 1, the drive pulley 50 starts to rotate by the power transmission through the forward/reverse switching mechanism 6. Therefore, when the rotational speed NDR of the drive pulley 50 has increased to YNDR1, the hydraulic oil pressure of the hydraulic circuit 11 can also be judged to have risen. Therefore, in this embodiment, a discrimination is made at step S4-31 as to whether the hydraulic oil pressure has risen or not based on the rotational speed NDR of the drive pulley 50. If there is a delay in the rise in the hydraulic oil pressure in the forward running clutch 64 or the reverse running brake 65, or if the range of the transmission has been switched to the non-running range of "N" or "P" position, a condition of NDR≧YNDR1 is sometimes not satisfied even though the hydraulic oil pressure has already risen. As a solution, in this embodiment, there is provided a step of S4-32 to discriminate as to whether the hydraulic oil pressure has risen or not also based on the rotational speed NE of the engine 1.

With reference to FIG. 3, when the processing of discriminating the rise in the hydraulic oil pressure has been made at step S4, a discrimination is then made at step S5 as to whether the flag F2 has been set to "1" or not. Until a condition of F2=1 is satisfied, i.e., until the hydraulic oil pressure in the hydraulic circuit 11 has risen, the program proceeds to step S6 to thereby set the hydraulic oil pressure command value PSCCMD to an initial pressure PSCA which is lower than the creeping pressure. Further, at step S7, the remaining time TM3 in a subtraction type of third timer is set to a predetermined time YTM3 (e.g., 500 msec). The initial pressure PSCA is set to a value substantially equal to a set load of a return spring 7a of the starting clutch 7. Even if the hydraulic oil pressure to the starting clutch 7 increases to the initial pressure PSCA, the starting clutch 7 only attains a state in which a non-effective stroke is eliminated down to the smallest extent possible and, thus, an engaging force will not occur. Therefore, even if the hydraulic oil pressure in the starting clutch 7 overshoots due to the rise in the hydraulic oil pressure in the hydraulic circuit 11, the starting clutch 7 will not be strongly engaged. Shocks will consequently not occur.

The above-described YTM2 is set to such a time as, for example, 200 msec considering the time required for the pulley side-pressure to rise by the oil supply to the cylinder 50c, 51c of the drive pulley 50 or the driven pulley 51c. Further, due to the processing at steps S4-25 and S4-33, the setting to "1" of the flag F2 is prohibited until a lapse of time of YTM2 from the point of time of the vehicle start-up. The hydraulic oil pressure command value PSCCMD is thus held at the initial pressure PSCA. In this manner, by the engaging of the starting clutch 7 before the rise in the pulley side-pressure, the belt 52 can be prevented from slipping.

Figure 5:
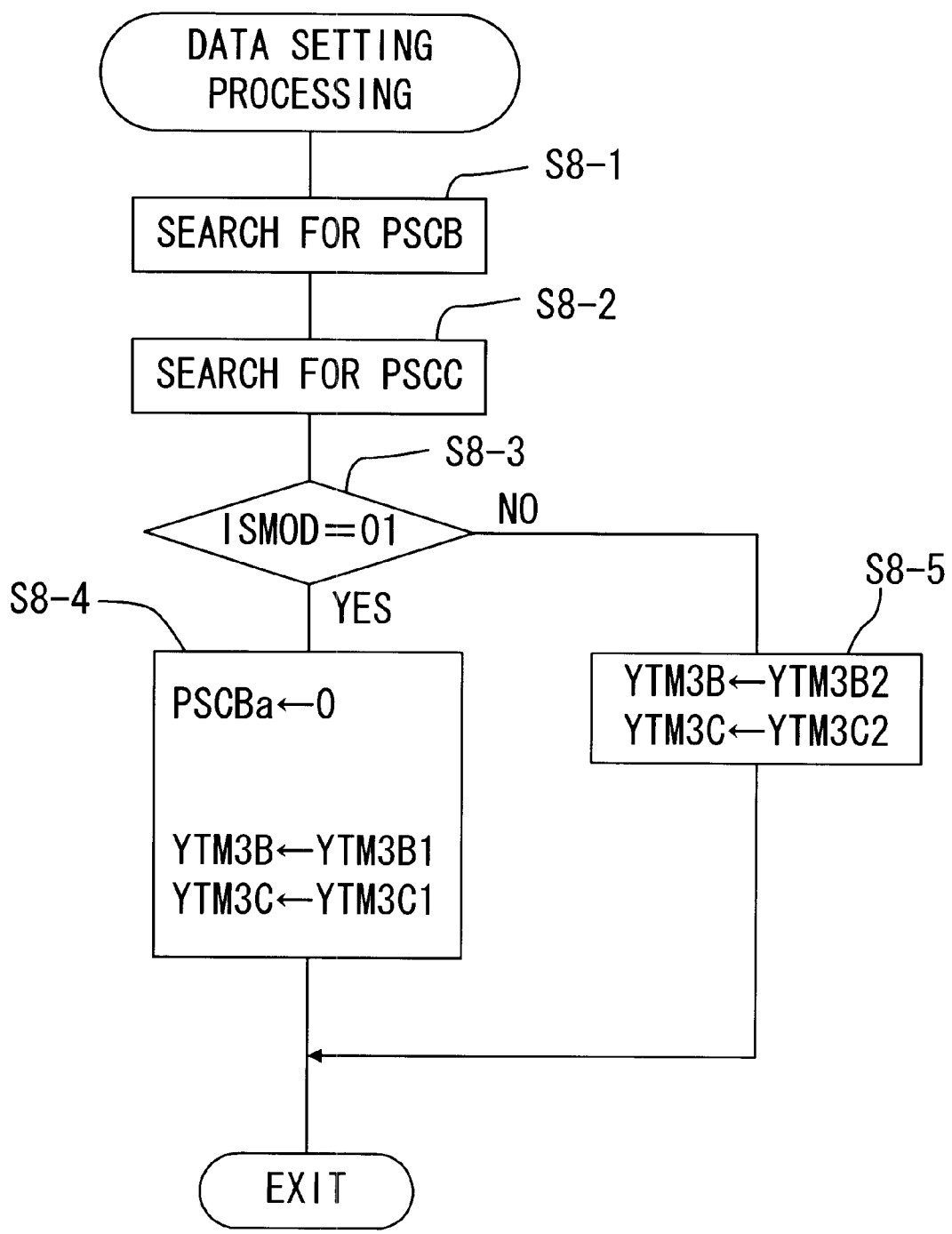
FIG. 5 is a flow chart showing the content of processing at step S8 of the control program in FIG. 3.

When the hydraulic oil pressure in the hydraulic circuit 11 rises and the flag F2 is set to "1", the program proceeds to step S8 to perform the data setting processing. Details of this data setting processing are shown in FIG. 5 and its detailed explanation will be made hereinbelow. At steps S8-1 and S8-2, an added value PSCB for the ineffective stroke eliminating pressure and an added value PSCC for the creeping pressure are respectively searched. PSCB and PSCC are set such that the lower the hydraulic oil temperature becomes, the higher they become, considering the delay in response to the increase in the hydraulic oil pressure. Values of PSCB and PSCC which correspond to the oil temperature at the present time are searched in the data table of PSCB and PSCC which has the oil temperature as a parameter.

Then, a discrimination is made at step S8-3 as to whether the step mode value ISMOD has been set to "01" or not. If ISMOD=01, the program proceeds to step S8-4. At step S8-4, a preliminarily added value PSCBa for the ineffective stroke eliminating pressure is re-written to zero. Further, a timer value YTM3B for judging the termination of the ineffective stroke eliminating pressure and a timer value YTM3C for judging the starting of the creeping pressure are set to first set values of YTM3B1 (e.g., 420 msec) and YTM3C1 (e.g., 400 msec), respectively. If ISMOD has been set to "02", the program proceeds to step S8-5, where YTM3B and YTM3C are set to second set values of YTM3B2 (e.g., 470 msec) and YTM3C2 (e.g., 450 msec), respectively.

With reference to FIG. 3, when the data setting processing has been finished at step S8 as described above, the program then proceeds to step S9. At step S9, a discrimination is made as to whether the remaining time TM3 in the third timer is above a predetermined set time YTM3A (e.g., 490 msec) or not, i.e., as to whether the time of lapse from the point of time of pressure rise is within YTM3–YTM3A or not. If a condition of TM3≧YTM3A is satisfied, the hydraulic oil pressure command value PSCCMD is set at step S10 to a value obtained by adding PSCB and PSCBa to PSCA. If a condition of TM3<YTM3A is satisfied, a discrimination is made at step S11 as to whether TM3 is above YTM3B or not, i.e., as to whether the time of lapse from the point of time of rise in the hydraulic oil pressure is within YTM3–YTM3B or not. If a condition of TM3≧YTM3B is satisfied, the hydraulic oil pressure command value PSCCMD is set at step S12 to a value obtained by adding PSCB to PSCA. If a condition of TM3<YTM3B is satisfied, a discrimination is made at step S13 as to whether TM3 is above YTM3C or not, i.e., as to whether the time of lapse from the point of time of rise in the hydraulic oil pressure is within YTM3–YTM3C or not. If a condition of TM3≧YTM3C is satisfied, the hydraulic oil pressure command value PSCCMD is set at step S14 to a value obtained by deducting, from a value obtained by adding PSCC to PSCA, that preliminarily deducted value PSCCa for the creeping pressure which is set in advance to a predetermined value. When a condition of TM3<YTM3C has been satisfied, the flag F1 is set at step S15 to "1" and also, at step S16, the hydraulic oil pressure command value PSCCMD is set to a value obtained by adding PSCC to PSCA. From the next time, a determination of "YES" is made at step S1 and the program thus proceeds to step S17. At step S17, a discrimination is made as to whether the remaining time TM1 in the first timer has become zero or not, i.e., as to whether the time of lapse from the point of time of setting the hydraulic oil pressure command value PSCCMD to PSCA+PSCC has become YTM1 or not. Then, when a condition of TM1=0 has been satisfied, a discrimination is made at step S18 as to whether or not the range of the transmission is "N" or "P." If the range is in a running range other than "N" and "P", a discrimination is made at step S19 as to whether the flag F9 has been set to "1" or not. Since the flag F9 has initially been set to "0", a determination of "NO" is made at step S19, and the program proceeds to step S20. At step S20, a discrimination is made as to whether the rotational speed NDR of the drive pulley 50 has exceeded a second predetermined speed YNDR2 or not. If TM1≠0, or if the range is "N" or "P", or if a condition of NDR<YNDR2 is satisfied, the remaining time TM4 in a subtraction type of fourth timer is set at step S21 to a predetermined time YTM4. The program then proceeds to step S16, where the hydraulic oil pressure command value PSCCMD is held at PSCA+PSCC.

Figure 8:
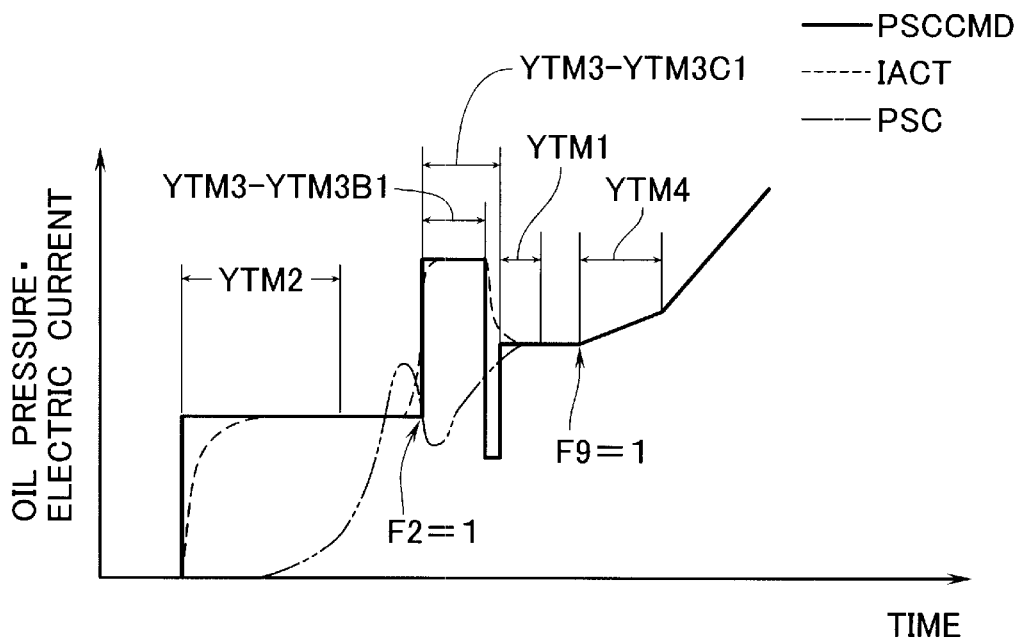
FIG. 8 is a time chart showing the changes in a hydraulic oil pressure command value PSCCMD, an effective electric current value IACT of a solenoid, and actual hydraulic oil pressure PSC in the starting clutch when the hydraulic circuit has no residual pressure.

Here, PSCC is set such that the value obtained by adding the initial value PSCA to PSCC becomes the creeping pressure. Further, PSCB is set to a value larger than PSCC. When ISMOD is set to "01" as a result of discrimination of the rise in the hydraulic oil pressure by the counter-electromotive force of the solenoid $15_{3a}$, PSCBa is re-written to zero as described hereinabove. Therefore, as shown in FIG. 8, until the time YTM3−YTM3B (=YTM3B1) has lapsed from the point of time of discrimination of the rise in the hydraulic oil pressure (i.e., the time when the condition of F2=1 has been satisfied), the hydraulic oil pressure command value PSCCMD is held at PSCA+PSCB, i.e., at the ineffective stroke eliminating pressure which is higher than the creeping pressure. During this period of time, an actual hydraulic oil pressure PSC in the starting clutch 7 increases at a good response toward the creeping pressure while minimizing the ineffective stroke. When the lapse of time from the point of time of discriminating the rise in the hydraulic oil pressure has exceeded YTM3−YTM3B, PSCCMD is switched to a value obtained by PSCA+PSCC−PSCCa, i.e., a value smaller than the creeping pressure, until the lapse of time becomes YTM3−YTM3C (=YTM3C1). When the lapse of time has exceeded YTM3−YTM3C, PSCCMD is switched to PSCA+PSCC, i.e., to the creeping pressure. In this manner, by temporarily making PSCCMD smaller than the creeping pressure when PSCCMD is switched from the ineffective stroke eliminating pressure to the creeping pressure, the effective electric current value IACT of the solenoid $15_{3a}$ lowers at a good response from the electric current value corresponding to the ineffective stroke eliminating pressure down to the electric current value corresponding to the creeping pressure. The actual clutch pressure PSC of the starting clutch 7 is then increased to the creeping pressure without giving rise to overshooting before the lapse of time YTM1 from the point of time at which PSCCMD was switched to the creeping pressure.

Figure 9:
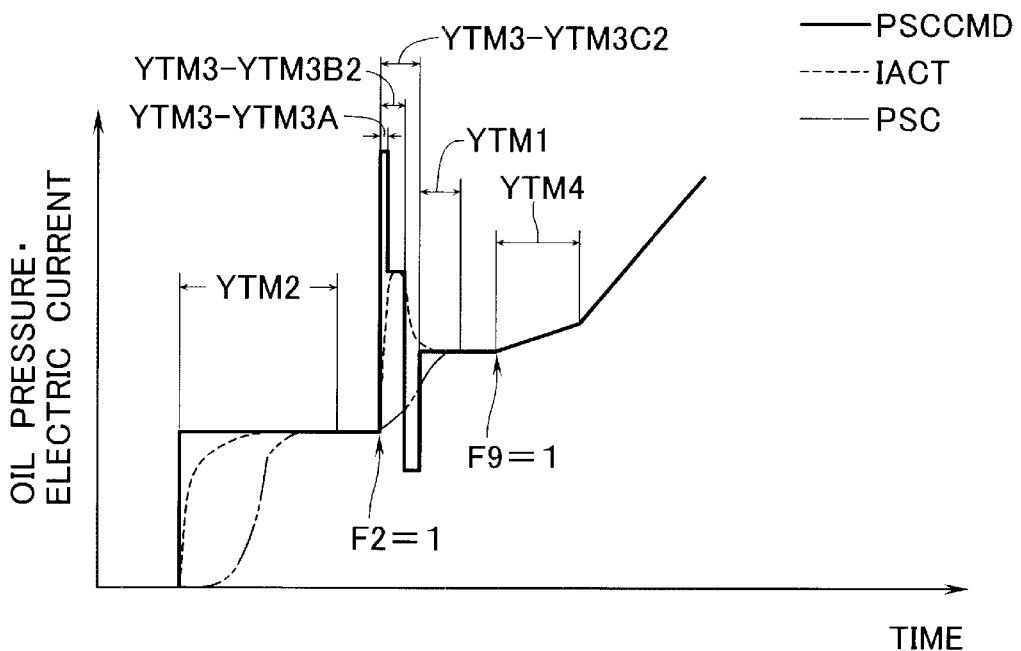
FIG. 9 is a time chart showing the changes in a hydraulic oil pressure command value PSCCMD, an effective electric current value IACT of a solenoid, and actual hydraulic oil pressure PSC in the starting clutch when the hydraulic circuit has a residual pressure.

When the rise in the hydraulic oil pressure is discriminated based on the rotational speed NDR of the drive pulley 50 and the rotational speed NE of the engine 1, and ISMOD is consequently set to "02", PSCCMD is switched, as shown in FIG. 9, to a value of PSCA+PSCB+PSCBa, i.e., to a value higher than the ineffective stroke eliminating pressure until the time of lapse from the point of time of discriminating the rise in the hydraulic oil pressure becomes YTM3−YTM3A. When the time of lapse has exceeded YTM3−YTM3A, PSCCMD is switched to PSCA+PSCB, i.e., the ineffective stroke eliminating pressure. In this manner, by temporarily making PSCCMD higher than the ineffective stroke eliminating pressure when PSCCMD is switched from the initial pressure PSCA to the ineffective stroke eliminating pressure, the effective electric current value IACT of the solenoid $15_{3a}$ increases at a good response from the electric current value corresponding to the initial pressure to the electric current value corresponding to the ineffective stroke eliminating pressure. When ISMOD is set to "01" the effective electric current value IACT has already increased by the counter-electromotive force. Therefore, it is not necessary to make PSCCMD higher than the ineffective stroke eliminating pressure for the purpose of improving the response of IACT. When the lapse of time from the time of discriminating the rise in the hydraulic oil pressure has exceeded YTM3−YTM3B (=YTM3B2), PSCCMD is switched to PSCA+PSCC−PSCCa, i.e., a value smaller than the creeping pressure until the lapse of time becomes YTM3−YTM3C (=YTM3C2). Thereafter, PSCCMD is switched to PSCA+PSCC, i.e., the creeping pressure. Here, it is when there is a residual pressure in the hydraulic circuit 11 that ISMOD is set to "02". Since the actual hydraulic oil pressure PSC of the starting clutch 7 increases at a relatively good response, YTM3B2 is set to a value larger than YTM3B1 to thereby shorten the time to hold PSCCMD at the ineffective stroke eliminating pressure.

Until the forward/reverse switching mechanism 6 becomes the in-gear state, PSCCMD is held at the creeping pressure, thereby preventing the occurrence of shocks by a sudden rise in the driving torque of the driving wheels of the vehicle at the time of gearing in. Here, whether the forward/reverse switching mechanism 6 has become the in-gear state or not can be discriminated by checking whether the deviation between the rotational speed NE of the engine 1 and the rotational speed NDR of the drive pulley 50 has fallen below a predetermined value or not. However, at the time of vehicle start-up from the state of engine stopping, the rotational speed of the engine 1 rapidly increases. Therefore, if the rotational speed of the engine 1 is calculated from the difference in times of inputting of the ignition pulses as described hereinabove, the calculated NE becomes considerably smaller than the actual NE and, as a result, the judgement of the in-gear state is delayed. Therefore, in this embodiment, the discrimination of the in-gear state is made based only on the rotational speed NDR of the drive pulley 50. In other words, as described above, a discrimination is made at step S20 as to whether the rotational speed NDR of the drive pulley 50 has exceeded a predetermined second speed YNDR2 (e.g., 700 rpm) or not. When a condition of NDR≧YNDR2 has been satisfied, it is judged that the forward/reverse switching mechanism 6 has become the in-gear state and, at step S22, the flag F9 is set to "1." The program then proceeds to step S23 and the following steps. The control mode of the starting clutch 7 is then switched from the previous start transition mode to the running mode.

In the running mode, first, an ordinary hydraulic oil pressure PSCN of the starting clutch 7 corresponding to the rotational speed NE of the engine 1 is calculated at step S23. Then, at step S24, a discrimination is made as to whether PSCN is above a limit value PSCLMT for annealing or not. If PSCN≧PSCLMT, a discrimination is made at step S25 as to whether the remaining time TM4 in the fourth timer is zero or not, i.e., as to whether the time of lapse from the point of time of the in-gear discrimination (=point of time when a state of F9=1 has been satisfied) has exceeded YTM4 or not. If TM4=0, a change limit value ΔPLMT on the positive (plus) side of the hydraulic oil pressure per one time is set at step S26 to an ordinary annealing value YΔPLMTN (e.g., 0.5 kg/cm²). If TM4≠0, ΔPLMT is set at step S27 to a value YΔPLMTS (e.g., 0.25 kg/cm²) which is smaller than YΔPLMTN. Then, at step S28, a discrimination is made as to whether an absolute value of the deviation between PSCN and PSCLMT is above ΔPLMT or not. If the deviation is above ΔPLMT, PSCLMT is re-written at step S29 to a value which is obtained by adding ΔPLMT to the preceding value of PSCLMT. If the deviation is below ΔPLMT, PSCLMT is re-written at step S30 to PSCN. Further, if a condition of PSCN<PSCLMT is satisfied, a discrimination is made at step S31 as to whether or not an absolute value of the deviation between PSCN and PSCLMT is above a predetermined upper limit value ΔPLMTM on the negative (minus) side (e.g., 0.5 kg/cm$^2$) of the hydraulic oil pressure. If the deviation is above ΔPLMTM, PSCLMT is re-written at step S32 to a value which is obtained by deducting ΔPLMTM from the preceding value of PSCLMT. If the deviation is below ΔPLMTM, PSCLMT is re-written at step S30 to PSCN as described hereinabove. In addition, at step S33, the hydraulic oil pressure command value PSCCMD is set to PSCLMT.

In this manner, when YTM4 has lapsed from the point of time of the discrimination of the in-gear state, the amount of increase (or increment) per time of the hydraulic oil pressure command value PSCCMD becomes the ordinary annealing value YΔPLMTN. However, until YTM4 has lapsed, the amount of increment per time of PSCCMD is limited to YΔPLMS which is smaller than the ordinary annealing value. PSCCMD, i.e., the speed of increase in the hydraulic oil pressure in the starting clutch 7 is limited to a relatively low speed.

In order to improve the durability of, and to reduce the friction loss of, the belt 52, the pulley side-pressure shall not be made larger than is required as compared with the transmission torque at the point of time in question. Therefore, in the start-up transition mode, the pulley side-pressure is made relatively low, and the pulley side-pressure is increased to suit the increase in the hydraulic oil pressure for the starting clutch 7 as a result of switching to the running mode. However, there are cases where the hydraulic oil pressure in the hydraulic circuit 11 has not been completely increased to the line pressure even at the time of switching to the running mode. If the speed of increasing (or boosting) the hydraulic oil pressure in the starting clutch 7 is accelerated, the increase in the pulley side-pressure is delayed and, as a result, there is a possibility that the belt 52 gives rise to slipping. In order to suit this kind of time which may give rise to the delay in the increase in the pulley side-pressure, the above-described YTM4 is set to 90 msec, for example. By keeping low the increasing speed of the hydraulic oil pressure in the starting clutch 7 during this period of time, the slipping of the belt 52 can be prevented.

Explanations have so far been made about an embodiment in which the present invention was applied to the control of starting clutch of the automatic transmission having the continuously variable transmission mechanism 5. The present invention can also be applied to the control of a starting clutch in a manual transmission which is mounted on a 2-pedal vehicle without a clutch pedal.

As can be seen from the above-described explanations, according to the present invention, at the time of vehicle start-up from the state of engine stopping, the hydraulic oil pressure in the starting clutch can be prevented from overshooting beyond the creeping pressure at the time of pressure rise in the hydraulic circuit, whereby the occurrence of shocks can be prevented. In addition, the hydraulic oil pressure in the starting clutch can be increased to the creeping pressure at a good response. The vehicle start-up from the state of engine stopping can be performed smoothly at a good response.

It is readily apparent that the above-described apparatus for controlling a starting clutch in a vehicle having a function of stopping engine idling meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling a starting clutch made up of a hydraulic clutch provided in a transmission of a vehicle having a function of stopping engine idling so that an engine is automatically stopped under given conditions when the vehicle is at a standstill, wherein a hydraulic oil pressure in the starting clutch is controlled by a linear solenoid valve provided in a hydraulic circuit having, as a hydraulic oil pressure source, a hydraulic oil pump driven by the engine, said apparatus comprising:

first hydraulic oil pressure command means which, at a time of vehicle start-up from a state of engine stopping, sets that hydraulic oil pressure command value in the starting clutch which is controlled by the linear solenoid valve to a predetermined initial pressure until the hydraulic oil pressure in the hydraulic circuit rises, said initial pressure being lower than a creeping pressure at which creeping of the vehicle occurs;

second hydraulic oil pressure command means which, during a predetermined period of time from a time at which the hydraulic oil pressure in the hydraulic circuit has risen to a time at which the hydraulic oil pressure increases to the creeping pressure, changes the hydraulic oil pressure command value to an ineffective stroke eliminating pressure which is higher than the creeping pressure; and third hydraulic oil pressure command means which changes the hydraulic oil pressure command value to the creeping pressure after a lapse of the predetermined period of time.

2. The apparatus according to claim 1, further comprising first discriminating means for discriminating a rise in the hydraulic oil pressure in the hydraulic circuit, said discriminating being made based on a counter-electromagnetic force to be generated in a solenoid of the linear solenoid valve.

3. The apparatus according to claim 2, further comprising prohibiting means for prohibiting the discrimination by the first discriminating means until a rotational speed of the engine increases to a first predetermined speed.

4. The apparatus according to claim 2, further comprising second hydraulic oil pressure rise discriminating means for discriminating that the hydraulic oil pressure has risen when a rotational speed of the engine has increased to a second predetermined speed.

5. The apparatus according to claim 3, further comprising second hydraulic oil pressure rise discriminating means for discriminating that the hydraulic oil pressure has risen when a rotational speed of the engine has increased to a second predetermined speed.

6. The apparatus according to claim 3, wherein a rotational speed to be calculated by a difference between a time of inputting a first engine ignition pulse and a time of inputting a second engine ignition pulse, both pulses being inputted after the engine stopping, is defined as a provisional speed, and wherein a point of time at which the rotational speed of the engine increases to the first predetermined speed is obtained from the provisional speed.

7. The apparatus according to claim 4, wherein a rotational speed to be calculated by a difference between a time of inputting a first engine ignition pulse and a time of inputting a second engine ignition pulse, both pulses being inputted after the engine stopping, is defined as a provisional speed, and wherein a point of time at which the rotational speed of the engine increases to the second predetermined speed is obtained from the provisional speed.

8. The apparatus according to claim 5, wherein a rotational speed to be calculated by a difference between a time of inputting a first engine ignition pulse and a time of inputting a second engine ignition pulse, both pulses being inputted after the engine stopping, is defined as a provisional speed, and wherein a point of time at which the rotational speed of the engine increases to each of the first and second predetermined speeds is obtained from the provisional speed.

9. The apparatus according to claim 3, wherein, at a time of vehicle start-up from a state in which the engine is not completely stopped, out of rotational speeds to be calculated by a difference between times of inputting two consecutive engine ignition pulses, a first rotational speed at which the rotational speed has changed for an increase is defined to be a provisional speed, and wherein a point of time at which the rotational speed of the engine increases to the first predetermined speed is obtained from the provisional speed.

10. The apparatus according to claim 4, wherein, at a time of vehicle start-up from a state in which the engine is not completely stopped, out of rotational speeds to be calculated by a difference between times of inputting two consecutive engine ignition pulses, a first rotational speed at which the rotational speed has changed for an increase is defined to be a provisional speed, and wherein a point of time at which the rotational speed of the engine increases to the second predetermined speed is obtained from the provisional speed.

11. The apparatus according to claim 5, wherein, at a time of vehicle start-up from a state in which the engine is not completely stopped, out of rotational speeds to be calculated by a difference between times of inputting two consecutive engine ignition pulses, a first rotational speed at which the rotational speed has changed for an increase is defined to be a provisional speed, and wherein a point of time at which the rotational speed of the engine increases to each of the first and second predetermined speeds is obtained from the provisional speed.

12. The apparatus according to any one of claims 2 through 11, further comprising third hydraulic oil pressure rise discriminating means for discriminating that the hydraulic oil pressure in the hydraulic circuit has risen when a rotational speed of a drive pulley of a belt type continuously variable transmission mechanism has increased to a predetermined speed, said continuously variable transmission mechanism being provided on an input side of the starting clutch in the transmission.

* * * * *

UNITED STATES PATENT AND TRADEMARK OFFICE
CERTIFICATE OF CORRECTION

PATENT NO.   : 6,344,016 B1
DATED        : February 5, 2002
INVENTOR(S)  : Takahiro Eguchi It is certified that error appears in the above-identified patent and that said Letters Patent is hereby corrected as shown below:

<u>Title page,</u>
Item [73], Assignee, change "Honda Kogyo Kabushiki Kaisha" to be -- Honda Giken Kogyo Kabushiki Kaisha --

Signed and Sealed this

Tenth Day of December, 2002

JAMES E. ROGAN
*Director of the United States Patent and Trademark Office*